United States Patent
Luick et al.

(10) Patent No.: US 11,176,660 B2
(45) Date of Patent: Nov. 16, 2021

(54) SORTING PISTONS WITH FLAWS

(71) Applicant: Caterpillar Inc., Deerfield, IL (US)

(72) Inventors: Kegan Luick, Dunlap, IL (US); Kevin P. Reardon, Corinth, MS (US); Allison Karen White, Manhattan, IL (US); Jason Robert Mrkonich, Antioch, IL (US); William Ryan McDermith, Lake Bluff, IL (US)

(73) Assignee: Caterpillar Inc., Peoria, IL (US)

( * ) Notice: Subject to any disclaimer, the term of this patent is extended or adjusted under 35 U.S.C. 154(b) by 104 days.

(21) Appl. No.: 16/522,460

(22) Filed: Jul. 25, 2019

(65) Prior Publication Data
US 2021/0027441 A1   Jan. 28, 2021

(51) Int. Cl.
*G06T 7/00* (2017.01)
*G06K 9/00* (2006.01)
*B07C 5/34* (2006.01)

(52) U.S. Cl.
CPC .............. *G06T 7/001* (2013.01); *B07C 5/34* (2013.01); *G06K 9/00214* (2013.01); *G06T 2207/30136* (2013.01); *G06T 2207/30164* (2013.01)

(58) Field of Classification Search
CPC ... B29C 64/386; B29C 67/0088; B33Y 50/00; B33Y 50/02; G05B 19/4207; G05B 2219/32228; G06T 7/001; G06T 2207/30164; G06T 2207/10116; G06T 2207/30004; B07C 5/34; G06K 9/00214
See application file for complete search history.

(56) References Cited

U.S. PATENT DOCUMENTS

| | | | |
|---|---|---|---|
| 8,238,635 B2 | 8/2012 | Can et al. | |
| 9,915,189 B2 | 3/2018 | Singh | |
| 2012/0330447 A1* | 12/2012 | Gerlach | G01B 21/20 700/95 |
| 2015/0292155 A1* | 10/2015 | Bomstad | D21G 9/0009 700/125 |
| 2016/0159011 A1* | 6/2016 | Marchione | B29C 67/0088 700/98 |
| 2018/0025486 A1* | 1/2018 | Shibayama | B23Q 17/24 382/108 |
| 2020/0184617 A1* | 6/2020 | Perron | B07C 5/34 |

FOREIGN PATENT DOCUMENTS

DE   102011076428 B4   10/2017

* cited by examiner

*Primary Examiner* — Michael J Vanchy, Jr.
(74) *Attorney, Agent, or Firm* — Procopio, Cory, Hargreaves & Savitch LLP

(57) ABSTRACT

A method and system for sorting pistons with flaws is disclosed. In an embodiment, a piston with flaws is three dimensionally scanned and compared to a reference image to detect the location and geometry of the flaws. The location and geometry of the flaws are recorded and used to generate a surface condition score. The pistons are sorted based on the surface condition score being higher or lower than a set threshold value.

10 Claims, 3 Drawing Sheets

US 11,176,660 B2

SORTING PISTONS WITH FLAWS

TECHNICAL FIELD

The present disclosure generally pertains to a piston, and is directed towards sorting pistons with flaws.

BACKGROUND

The fields of machine component salvaging have grown significantly in recent years. Systems and components that only recently would have been scrapped are now sorted and can be repaired and/or refurbished and returned to service. These machined components may have defects and flaws, but can still maintain structural integrity and functionality. Potential consumers may be willing to purchase machine components with aesthetics flaws or that have been repaired depending on the cost and several factors of the machined component. With this goal in mind, machined parts can be sorted with respect to their condition.

U.S. Pat. No. 8,238,635 to Can et. al. describes a method for identifying defects in radiographic image data corresponding to a scanned object. The method includes acquiring radiographic image data corresponding to a scanned object. In one embodiment, the radiographic image data includes an inspection test image and a reference image corresponding to the scanned object. The method includes identifying one or more regions of interest in the reference image and aligning the inspection test image with the regions of interest identified in the reference image, to obtain a residual image. The method further includes identifying one or more defects in the inspection test image based upon the residual image and one or more defect probability values computed for one or more pixels in the residual image.

The present disclosure is directed toward overcoming one or more of the problems discovered by the inventors or that is known in the art.

SUMMARY

A system and method of sorting machined parts with flaws are disclosed herein. In embodiments, an automated method of sorting includes performing a three dimensional scan of the piston. The method further includes creating a three dimensional piston image from the three dimensional scan of the piston. The method further includes comparing the three dimensional piston image to a reference image to identify one or more flaws. The method further includes generating metrology data for each of the one or more flaws. The method further includes generating a surface condition score based on the metrology data. The method further includes sorting the piston based on the surface condition score.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

Figure 1:
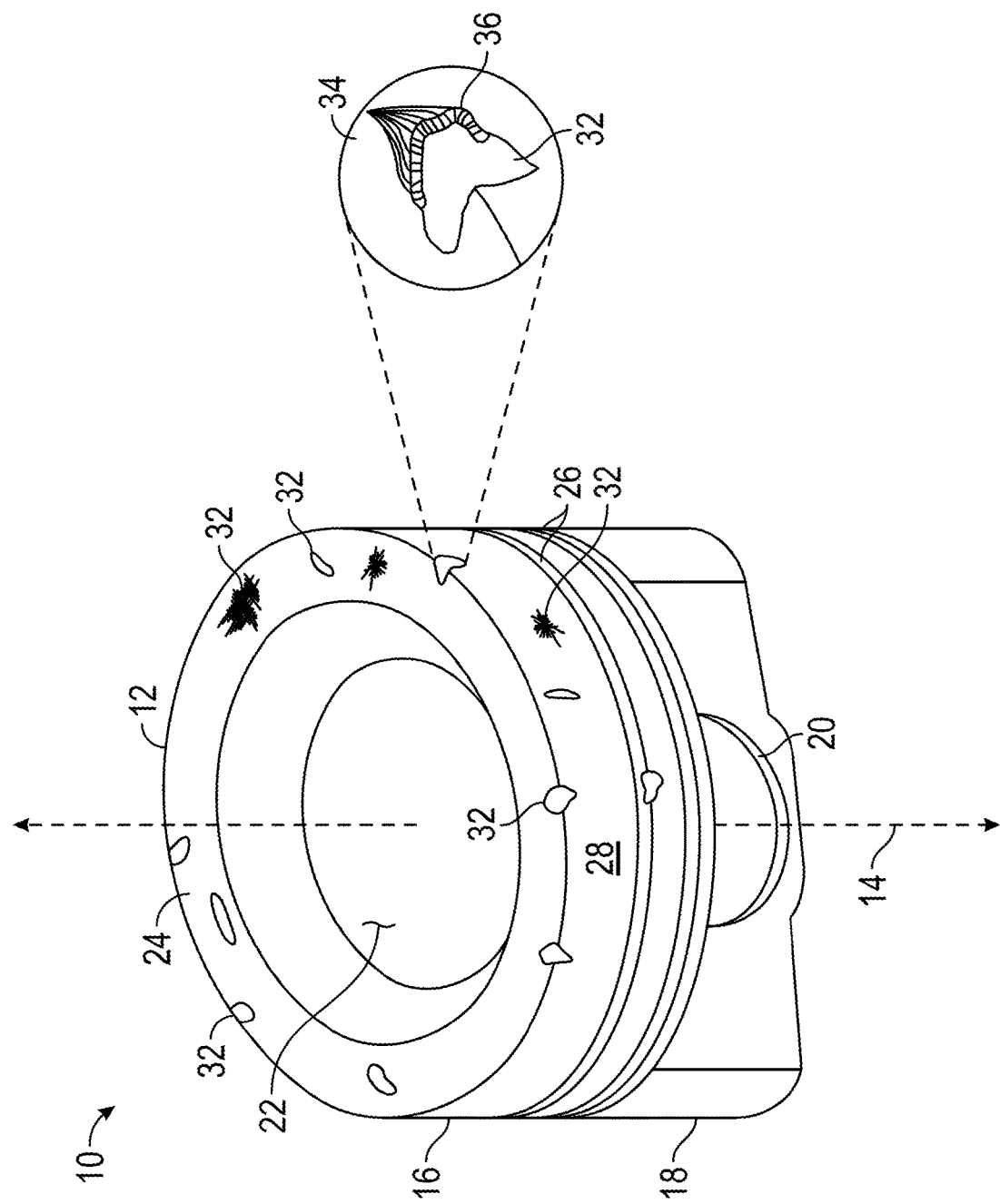
FIG. 1 is a schematic illustration of an exemplary piston with flaws.

FIG. 1 is schematic illustration of an exemplary piston with flaws. A piston 10 having a piston body 12, having been removed from service in an internal combustion engine. Piston body 12 includes a piston crown 16 and a piston skirt 18 and defines a longitudinal axis 14. A wrist pin bore 20 extending normal to axis 14 is formed in skirt 18 and configured to receive a wrist pin for coupling piston body 12 with a piston rod in a conventional manner. A combustion bowl 22 is formed in crown 16 and is surrounded by an annular rim 24 circumferential of axis 14. A plurality of piston ring grooves 26 are formed in an outer surface 28 of piston body 12 within crown 16, and also extend circumferentially around longitudinal axis 14. The piston body 12 may be formed of a base material 34 which is the cast metallic material such as steel or iron used in originally manufacturing the piston.

The piston 10 may include flaws 32 that are located on the outer surface 28 and annular rim 24 of the piston 10. Flaws 32 may have the form of dings, dents, voids, pits or scratches, for example. In some instances, flaws 32 may be formed by a base material 34 of piston body 12 which is displaced, meaning not actually removed, by striking the piston against something else. In FIG. 1, displaced base material 36 is shown in the detailed enlargement, having been pushed out of its intended location to create a void. In other instances, base material 34 might not be merely displaced but instead chipped, cut or flaked away to form a void. The flaws 32 in some instances might be deposits of foreign material on piston body 12, corroded base material of piston body 12, base material 34 which is corroded and pitted to a porous state, or still another feature.

Figure 2:
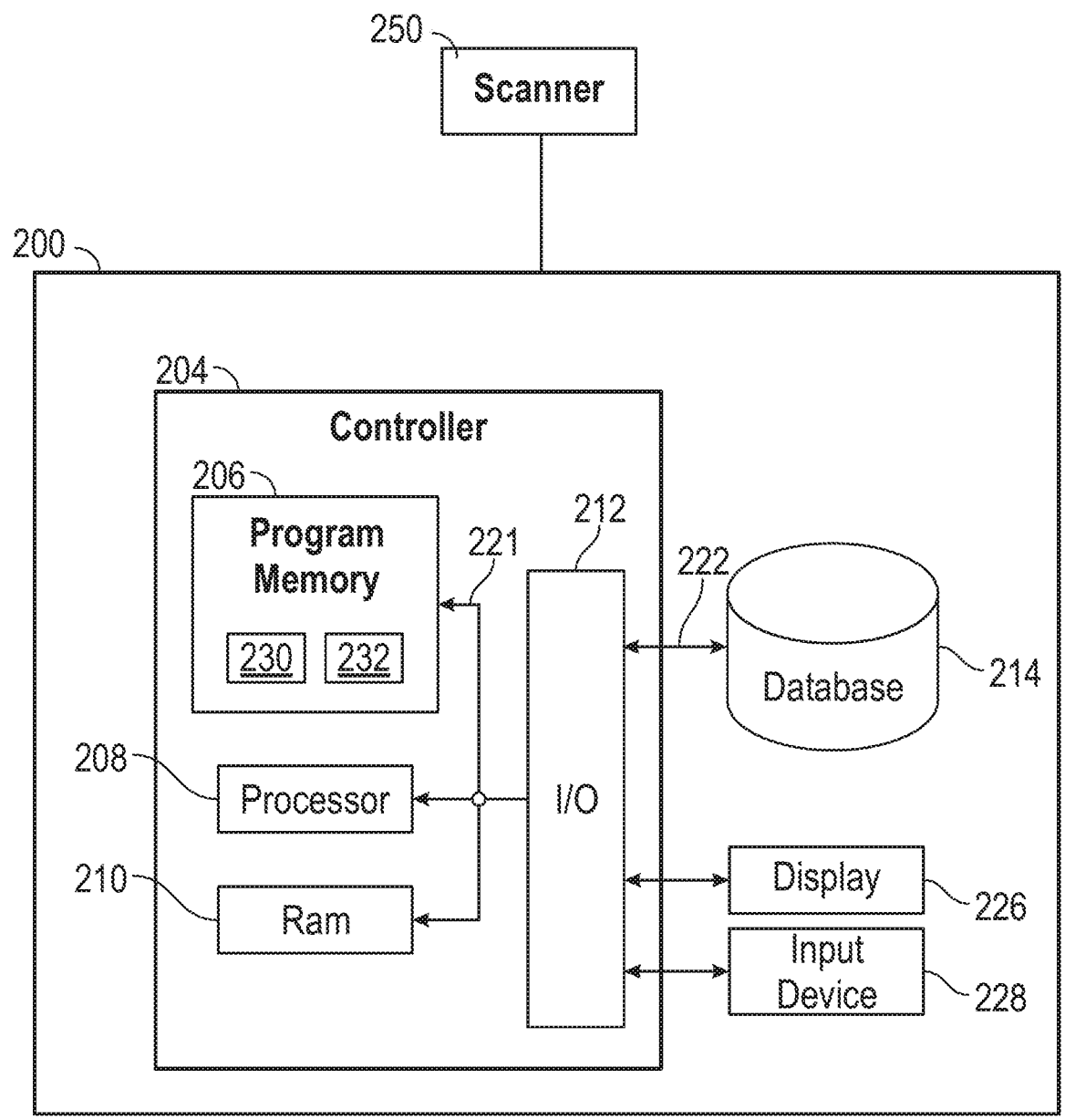
FIG. 2 is a functional block diagram of a computer system.

FIG. 2 is a functional block diagram of a computer system 200. In certain embodiments, the computer system 200, sometimes referred to as a piston sorting system, is in communication with a three dimensional (3D) scanner 250. In embodiments the 3D scanner 250 can included a computer such as the computer system 200. The computer system 200 may have a controller 204 operatively connected to a database 214 via a link 222 connected to an input/output (I/O) circuit 212. It should be noted that, while not shown, additional databases 214 may be linked to the controller 204 in a known manner. Furthermore, these databases 214 may be external to the computer system 200.

The controller 204 can include a program memory 206, the processor 208 (may be called a microcontroller or a microprocessor), a random-access memory (RAM) 210, and the input/output (I/O) circuit 212, all of which are interconnected via an address/data bus 221. It should be appreciated that although only one microprocessor 208 is shown, the controller 204 may include multiple microprocessors 208. Similarly, the memory of the controller 204 may include multiple RAMs 210 and multiple program memories 206. Although the I/O circuit 212 is shown as a single block, it should be appreciated that the I/O circuit 212 may include a number of different types of I/O circuits. The RAM(s) 210 and the program memories 206 may be implemented as semiconductor memories, magnetically readable memories, nonvolatile memories, and/or optically readable memories, for example.

The program memory 206 and RAM 210 can be a non-transitory computer-readable medium having stored thereon computer-executable code (e.g., disclosed software or subroutines) and/or data. The program memory 206 and/or the RAM 210 may store various applications (i.e., machine readable instructions) for execution by the microprocessor 208. For example, an operating system 230 may generally control the operation of the computer system 200 and provide a computing environment to implement the processes described herein. The program memory 206 and/or the RAM 210 may also store a variety of software 232 for accessing specific functions of the computer system 200. In addition to the controller 204, the computer system 200 may include other hardware resources. The computer system 200 may also include various types of input/output hardware such as the visual display 226 and input device(s) 228 (e.g., keypad, keyboard, mouse, etc.). In an embodiment, the display 226 can be touch-sensitive, and may cooperate with a software keyboard routine as part of the software 232 to accept user input. The software 232 may implement other functions, for example, implementing software keyboard functionality, interfacing with other hardware in the computer system 200, etc.

The display 226 can display user input fields through a graphical user interface. The input fields of the graphical user interface can accept information related to flaw dimensions and other information inputted by a user interacting with the input device 228.

The software 232 may include code to execute any of the operations described herein. The program memory 206 and/or the RAM 210 may further store data related to the configuration and/or operation of the computer system 200, and/or related to the operation of the software 232.

INDUSTRIAL APPLICABILITY

Sorting of pistons 10 based on their physical condition as useable and non-useable can be time consuming, inconsistent, and expensive when visually sorted by individuals. An automated method that sorts pistons based on metrology data can decrease the sorting time for each piston 10, reduce cost, and improve consistency of which pistons 10 are considered useable and which are considered not useable.

Figure 3:
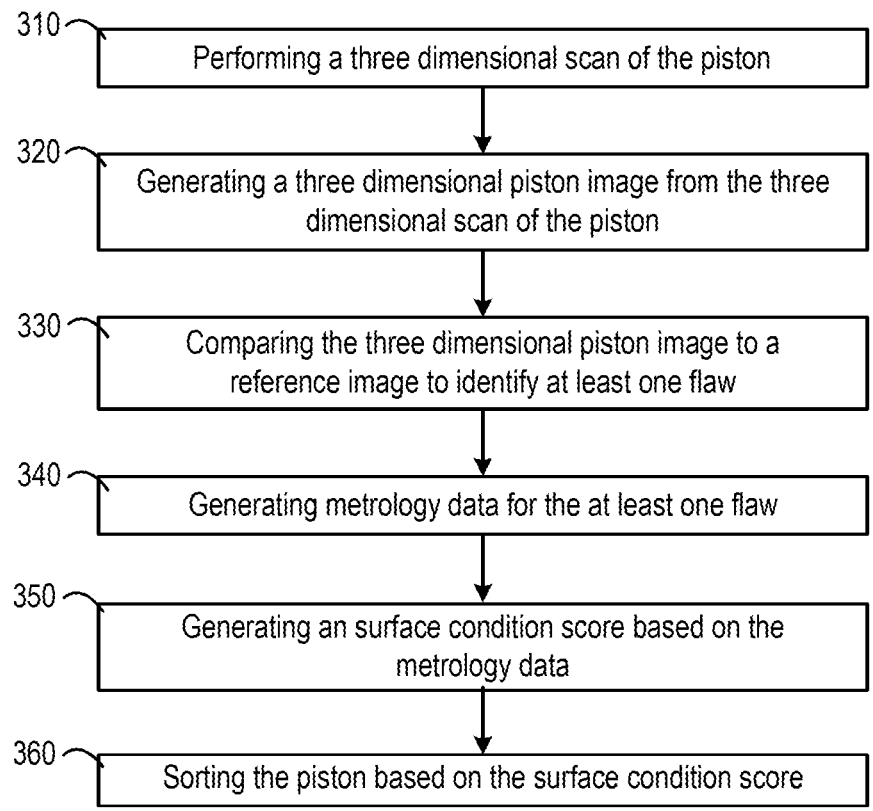
FIG. 3 is a flowchart of a method for sorting pistons with flaws.

FIG. 3 is a flowchart of a method for sorting pistons with flaws. The automated method begins at block 310 and includes performing a three dimensional (3D) scan of the piston 10. In other embodiments the piston 10 can represent a different engine component or machined component, and can be scanned and sorted in a similar fashion to the piston 10. The 3D scan can be performed by a 3D scanner 250, which may include a computer system 200. The 3D scanner 250 can transmit the 3D scan information relating to the piston 10 to the computer system 200. In other words, the computer system 200 receives the three dimensional scan of the piston 10. In examples multiple scans can be performed and scans can be taken at different angles and rotations. A developer spray can be applied to the piston 10 prior to the 3D scan to reduce the reflectivity of the piston 10. The developer spray can produce an opaque, white coat that minimizes the piston's reflectivity.

At block 320 a 3D piston image is generated from the 3D scan of the piston. The computer system 200 can generate the 3D piston image from the 3D scan information sent from the 3D scanner 250. In an embodiment, the software of the computer system 200 can generate the 3D piston image from the 3D scan information sent from the 3D scanner 250. In other embodiments the 3D scanner 250 generates the 3D piston image.

At block 330 the 3D piston image is compared to a reference image to identify flaws 32. The computer system 200 can compare the 3D piston image to a reference image to identify one or more flaws 32. The differences between the reference image and 3D piston image can represent locations and geometry of flaws 32 on the piston. The reference image may be a reference plane such as a three point plane or multiple reference planes. In an example using a two dimensional comparison technique, a desired surface of the 3D piston image can be selected and used in a pixel comparison with the reference plane. The reference image may be a 3D image of a piston having ideal geometry. In an example using a three dimensional comparison technique, the 3D piston image can be used in a voxel comparison with the 3D image of a piston having ideal geometry.

At block 340 metrology data for the at least one flaw 32 is generated. The computer system 200 can generate metrology data for each of identified flaws 32. The metrology data can include the dimensions of the flaws 32, for example width, length, depth, area, volume, and other dimensions. The metrology data can include the location of each flaw 32, for example the flaws proximity, position, and orientation to features of the piston 10. For example, if two flaws of the same size and geometry are positioned in low and high stress regions on the same piston 10, it would be beneficial to classify the sorting criteria to more sensitive with respect to the high stress region. For example rejecting a flaw 32 that may be acceptable if located in a low stress region.

The metrology data can include the position, distance, and orientation of each of the flaws 32 with respect to each of the other flaws 32. For example, if one flaw 32 neighbors another flaw 32 they can mechanically act together as a combined larger flaw.

The metrology data can include the total, also referred to as sum, of the surface areas of each of the flaws. The metrology data can include the sum of the areas, with respect to a selected plane, of each of the flaws 32 and can relate to the percent coverage of the flaws. The metrology data can include ratios between length, width, and depth of each of the flaws 32.

At block 350 a surface condition score based on the metrology data is generated. The computer system 200 can generate the surface condition score based on the metrology data. The metrology data can include characteristics of the flaws. These flaw characteristics can include at least one of, inter alia, the number of flaws detected on the piston, the maximum depth of the flaws, the sum of the maximum depths of the flaws, an average of the maximum depths of the flaws, the sum of the volumes of the flaws, the sum of the surface areas of the flaws, the percent coverage of the flaws, the position and orientation of the flaws 32 on the piston 10, and the position, distance, and orientation of the flaws 32 with respect to each of the other flaws 32 detected.

Each of the characteristics can be assigned a range of values, for example a range from one to ten with one representing no flaw and ten representing a severe flaw. Each of the values within the range of values can be associated with a dimension range that is in respect to the specific type of characteristic. These dimension ranges can be set by known function limits for the piston 10. The dimension ranges can be set by commercial limits dictated by customer acceptance. The dimension ranges can be uniform or may be non-uniformly distributed.

In an example, the dimension ranges can be 0 to 3 mm$^2$, 3.01 to 3.25 mm$^2$, 3.26 to 3.5 mm$^2$, 3.51 to 3.75 mm$^2$, 3.76 to 4.0 mm$^2$, and greater than 4.0 mm$^2$. The 0 to 3.0 mm$^2$ range may use low scan resolution and can be associated with a low range value such as a 0 or 1. The 3.01 to 3.25 mm$^2$, 3.26 to 3.5 mm$^2$, 3.51 to 3.75 mm$^2$, and 3.76 to 4.0 mm$^2$ ranges may use fine scan resolution and can be associated with range values such 2.0, 2.5, 3.5, and 4.0 respectively. The greater than 4.0 mm$^2$ range may use low scan resolution and can be associated with a high range value such as a 10 or may lead to an automatic fail and the piston 10 is sorted as not to be used.

In an example, with respect to the sum of the volumes for each flaw characteristic, the range value of five can be associated with the range of 5 to 5.9 mm$^3$. The metrology data can include the value of 5.1 mm$^3$ which falls between 5 and 5.9 mm$^3$, and leads to a range value of five. In another example, with respect to the sum of the surface areas for each flaw characteristic, the range value of three can be associated with the range of 4 to 5.9 mm$^2$. The metrology data can include the value of 4.0 mm$^2$ which falls between 4 and 5.9 mm$^2$, and leads to a range value of three.

Each of the characteristics can also be assigned a weighted multiplier, which can vary between characteristics. For example the sum of the volumes for each flaw characteristic can have a weighted multiple of two and the sum of the surface areas for each flaw characteristic can have a weighted multiple of three.

The surface condition score can be the sum of the range values multiplied by their respective weighted multiplier for each characteristic considered. For example, using the sum of the volumes for each of the flaws and sum of the surface areas for each flaw examples above, the surface condition score can equal the sum of five times two and three times three, which is nineteen. The surface condition score can be based on one or more characteristics relating to metrology data and can be based on weighted multipliers along with other factors and variables. In an example the surface condition score is determined using the risk priority number (RPN) method.

At block 360 the piston 10 is sorted as useable or not useable based on, for example, the surface condition score and a surface condition score threshold. The sorting can be performed by machinery controlled by the computer system 200. The surface condition score threshold can be set at a specific value. If the surface condition score exceeds the threshold, the piston 10 can be sorted as not useable. If the surface condition score is less than the threshold, the piston 10 can be sorted as useable. The pistons 10 sorted as useable can be remanded or refurbished to bring the pistons to a sellable condition. In another example, the computer system 200 can grade the piston 10 based on the surface condition score. In an example, the grading can have multiple tiers such the piston being graded as no remanufacturing needed, light remanufacturing needed, medium remanufacturing needed, heavy remanufacturing needed, and not useable. In an example the grading process includes marking the piston 10, such as flagging with a serial number and labeling with a sticker.

The computer system 200 can record each of the surface condition scores and record the magnitude at which each of the flaw characteristics contributed to the surface condition score. For example the sum of the volumes of the flaws contributed 80% to the surface condition score and the sum of the surface areas of the flaws contributed 20% to the surface condition score. This information can be used to show how the pistons 10 are failing and may highlight areas to be reengineered for improvements.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. An automated method of sorting a salvaged piston, the method comprising:
   performing a three dimensional scan of the salvaged piston;
   creating a three dimensional piston image from the three dimensional scan of the salvaged piston;
   comparing the three dimensional piston image to a reference image to identify flaws;
   generating metrology characteristic data for each of the flaws, including a volume and a maximum depth of the flaws;
   generating a surface condition score based on the metrology characteristic data, including a sum of volumes for the flaws and the maximum depths for each of the flaws;
   wherein each characteristic is assigned a weighted multiplier;
   and record the magnitude at which each of the flaw characteristics contributed to the surface condition score; and
   sorting the salvaged piston based on the surface condition score.

2. The automated method of claim 1, wherein the surface condition score is further based on a quantity of the flaws identified.

3. The automated method of claim 1, wherein the surface condition score is further based on a sum of the maximum depths for each of the flaws.

4. The automated method of claim 3, wherein the surface condition score is further based on an average of the maximum depths for the flaws.

5. The automated method of claim 1, wherein the metrology data for each of the flaws includes a surface area and the surface condition score is further based on a sum of the surface areas for the flaws.

6. A salvaged piston sorting system comprising:
   at least one processor; and
   a memory storing software that, when executed by the at least one processor causes the processor to, receive a three dimensional scan of a salvaged piston;
   create a three dimensional piston image from the three dimensional scan of the salvaged piston;
   compare the three dimensional piston image to a reference image to identify flaws;
   generate metrology characteristic data for each of the flaws including a volume and a maximum depth of the flaws; and
   generate a surface condition score based on the metrology characteristic data including, a sum of volumes for the flaws and the maximum depths for each of the flaws;

wherein each characteristic is assigned a weighted multiplier;

and record the magnitude at which each of the flaw characteristics contributed to the surface condition score; and sorting the salvaged piston based on the surface condition score.

7. The salvaged piston sorting system of claim 6, wherein the surface condition score is further based on a quantity of the flaws identified.

8. The salvaged piston sorting system of claim 6, wherein the surface condition score is further based on a sum of the maximum depths for each of the flaws.

9. The salvaged piston sorting system of claim 8, wherein the surface condition score is further based on an average of the maximum depths for the flaws.

10. The salvaged piston sorting system of claim 6, wherein metrology data for each of the flaws includes a surface area and the surface condition score is further based on a sum of the surface areas for the flaws.

* * * * *